Oct. 23, 1956 S. P. BIRD 2,768,010
LENGTH COMPENSATING CONDUIT COUPLING
Filed Feb. 15, 1952

Inventor-
Stanley P. Bird
by his Attorney
Alfred F. Kronman.

United States Patent Office 2,768,010
Patented Oct. 23, 1956

2,768,010

LENGTH COMPENSATING CONDUIT COUPLING

Stanley P. Bird, Verona, N. J., assignor to Breeze Corporations, Inc., Newark, N. J., a corporation of New Jersey Application February 15, 1952, Serial No. 271,811

2 Claims. (Cl. 285—286)

This invention relates to conduit couplings such as are used to connect the various elements of a radio shielded ignition system for internal combustion engines.

Radio shielded ignition systems comprise shielded components linked together by means of conduit covered cables. These leads are generally provided with threaded ferrules which are engaged by nuts for the purpose of mechanically and electrically joining the elements involved. Each coupling point, however, presents a possible area of shielding failure due to the fact that moisture sometimes finds its way into the ignition system at such points.

In order to avoid failure due to moisture entering the ignition system at the couplings, it is necessary to employ some form of sealing gasket. Sealing gaskets are usually made from a resilient material capable of being compressed by the tightening action of a nut upon the ferrule, which compression seals the interior of the coupling from moisture.

Presently known shielding structures employing the sealing devices described above have frequently failed because of the fact that it is almost impossible to provide an electrical ignition wire of precisely the right length within the leads. Thus for example, if the ignition wire is of exactly the length of the space between the points to be coupled, the tightening of the ferrule for the purpose of compressing the sealing gasket forces the ignition wire back into the conduit.

If the opposite end of the ignition element has been coupled securely, there is nowhere for the ignition wire to go. It is thus forced back upon itself, with the result that the cable becomes damaged by kinking or perhaps caused to pierce the insulation surrounding it, thereby causing electrical "shorting." It is obvious that if the ignition wire is cut shorter than the space between the elements to be connected, an unsatisfactory electrical contact may result.

Accordingly, it is an object of the present invention to provide a conduit coupling which will enable the ignition wire carried therein to remain stationary, despite the fact that the sealing gasket member is compressed so as to provide watertight integrity.

Another object of the present invention is to provide a conduit coupling which will permit the effective length of a conduit to extend the exact length required to maintain the cable in its original straight condition.

A further object of the present invention is to provide a conduit coupling which will prevent moisture from entering sections of an ignition system.

A feature of the present invention is the use of a bellows for the purpose of altering the effective length of a conduit.

Another feature of the present invention is the provision of a spring loaded gasket to prevent moisture from entering the ignition system.

The invention consists of the construction, combination and arrangement of parts, as herein illustrated, described and claimed.

In the accompanying drawings forming a part hereof, is illustrated one form of embodiment of the invention, in which drawings similar reference characters designate corresponding parts, and in which.

Figure 1:
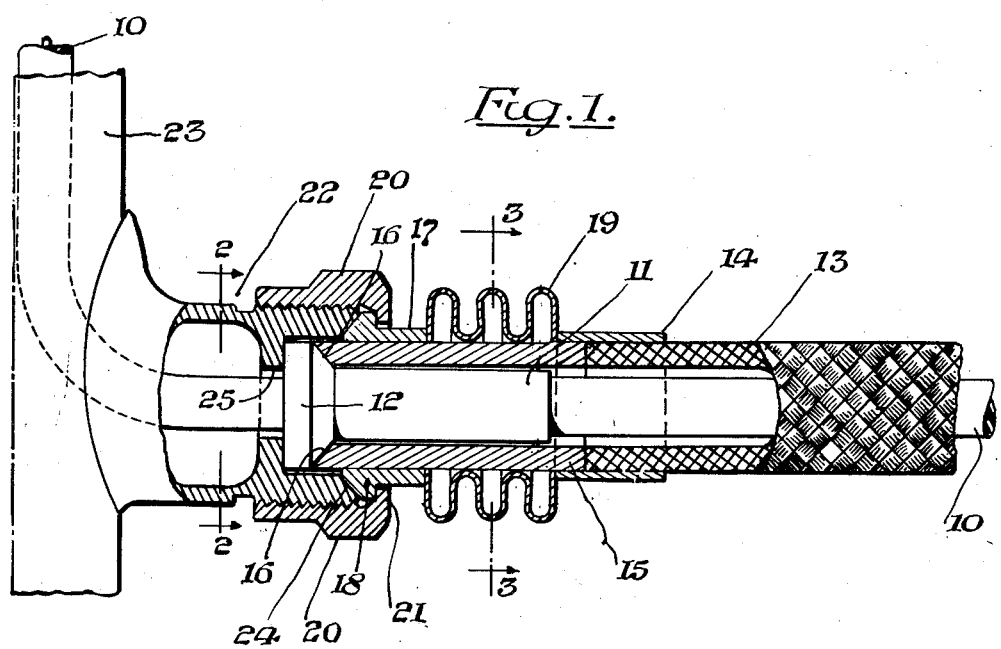
Figure 1 is a vertical section taken through a conduit coupling made in accordance with the present invention.
Figures 2, 3:
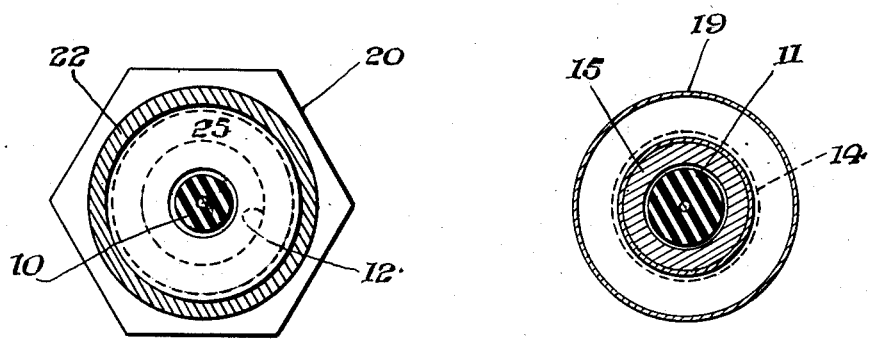
Figure 2 is a sectional view, taken on line 2—2 of Figure 1, looking in the direction indicated by the arrows.
Figure 3 is a sectional view, taken on line 3—3 of Figure 1, looking in the direction indicated by the arrows.

Referring to the drawings, 10 indicates a length of ignition cable of a dimension exactly equal to the distance between the space coupling points. A resilient dielectric gasket 11 is slipped over one end of an ignition cable 10, said gasket 11 being provided with a frustro-conical collar 12 at the coupling end thereof. The ignition cable 10 is carried within a suitable shielding structure, such as a braided conduit 13. A sleeve 14 is silver-soldered to the end of the braided conduit 13, so as to overlie both the end of the conduit 13 and the end of an electrically conductive tubular member 15. The sleeve 14, the tubular member 15 and the end of the braided conduit 13 are all silver-soldered together to form an electrically conductive unit. Alternately, the sleeve and tubular member may be integral. The coupling end of the tubular member 15 is provided with an internal seat 16, to receive thereon the tapered collar 12 of the end of the sealing gasket 11.

A slidable ferrule member 17, having thereon the ball 18 of a ball and cone type of joint, is disposed about the coupling end of the tubular member 15. Intermediate the ferrule 17 and the sleeve 14 there is provided a bellows 19. The bellows 19 may consist of a convoluted metal section surrounding the tubular member 15. One end of the bellows 19 is secured to the coupling end of the sleeve 14, as by welding or the like. The opposite end of the bellows member is similarly secured to the end of the slidable ferrule 17, opposite the ball 18. The slidable ferrule 17 may be moved along the tubular member 15, without affecting the relative positions of the braided conduit and the ignition cable.

A coupling nut 20 is carried upon the outside of the slidable ferrule 17, and restricted in its longitudinal travel by the outwardly disposed ball 18 on said ferrule, and the inwardly disposed flange 21 of the nut 19. In Figure 1 the coupling point has been indicated as the threaded outlet 22 of a shielded ignition harness manifold 23. The outlet 22 is provided with a cone 24 adapted to receive therein the ball 18 of the ring shaped member 17.

An internal shoulder or boss 25 is required in the structure of the complementary coupling for the purpose of bearing against the collar 12 of the sealing gasket 11.

The bellows 19 is formed of a material of such strength that a specific amount of force is required in order to expand it longitudinally. The requisite force is calculated on the basis of the pressure required to force the tapered portion 12 of the sealing gasket 11 into liquid-proof contact with the internal seat 16 of the tubular member 15.

As the coupling nut 20 is engaged with the threads of the outlet 22 and tightened thereon, the tubular member 15 is brought into contact with the tapered collar 12 of the sealing gasket 11. Thereafter, as the tightening operation continues, the slidable ferrule 17 is pulled forward, thereby extending the bellows 19. The resistance of the bellows member to longitudinal deformation, forces the boss 25 into contact with the sealing gasket collar 12, thereby compressing it against the seat 16 of the member 15. The construction of the coupling is such that the force exerted upon the sealing gasket 11 is at its maximum when the ball seat 18 comes into contact with the cone 24 of the outlet 22. The result of this construction is to provide a spring loading of the sealing gasket 11, without recourse to the presently known internal spring structure. In addition, by selecting the bellows material of some suitable electrically conductive material, such as monel or the like, adequate shielding of the coupling against the leakage of radio frequency energy may be secured.

The frictional contact between the sealing gasket 11 and the inner surface of the tubular member 15 will resist any torque imparted to the shielded conduit by rotation of the nut 20. This resistance to rotation, together with the high torsional movements in the bellows and all other details of the assembly, overcomes any tendency to twist the conduit during assembly, or to damage other parts of the shielded ignition system, thereby.

Having thus fully described the invention, what is claimed as new and sought to be secured by Letters Patent of the United States, is:

1. A coupling for use between a flexible conduit and an outlet, a tubular member secured at one end to the conduit, a tapered seat in the other end of said tubular member, a sealing gasket having a portion freely carried within the said tubular member and having an enlarged frusto-conical intermediate portion and a cylindrical end portion, said frusto-conical intermediate portion being received within said tapered seat, a ferrule slidably carried upon the outside of the tubular member, an outwardly disposed flange on one end of said ferrule, a bellows surrounding the said tubular member between the said ferrule and said conduit, one end of said bellows being secured to the other end of the ferrule and the opposite end of the bellows being attached to the conduit, said outlet comprising a hollow threaded member, a boss within said threaded member, said threaded member having a face adapted to engage the flange on said ferrule, a coupling nut having an inwardly disposed flange on the conduit end thereof in engagement with the outwardly disposed flange on the said ferrule, said coupling nut being threadably engaged with the outlet end whereby said gasket is compressed between the boss and the said tapered seat upon threading of said nut onto the outlet thereby forming a liquid tight coupling.

2. The device of claim 1, wherein the conduit is a metallic shielded cable and the means to attach the bellows to the conduit including a sleeve, disposed over said conduit, said sleeve, and conduit being soldered together, and said bellows being welded to said sleeve.

References Cited in the file of this patent

UNITED STATES PATENTS

| | | |
|---|---|---|
| 1,726,483 | Giesler | Aug. 27, 1929 |
| 2,087,920 | Mascuch | July 27, 1937 |
| 2,105,791 | Mascuch | Jan. 18, 1938 |
| 2,366,809 | Seemann | Jan. 6, 1945 |
| 2,529,534 | Beerli | Nov. 14, 1950 |
| 2,533,923 | Edwards | Dec. 12, 1950 |